(12) United States Patent
Hibino

(10) Patent No.: US 6,224,104 B1
(45) Date of Patent: May 1, 2001

(54) IMPACT-ABSORBING STEERING COLUMN DEVICE

(75) Inventor: Tadashi Hibino, Gunma-ken (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/199,446

(22) Filed: Nov. 25, 1998

(30) Foreign Application Priority Data

Dec. 3, 1997 (JP) .................................................... 9-347359

(51) Int. Cl.⁷ .................................................................. B62D 1/11
(52) U.S. Cl. .................................................................. 280/777
(58) Field of Search ............................................. 280/777

(56) References Cited

U.S. PATENT DOCUMENTS

| 3,262,332 | 7/1966 | Wight ........................... 74/493 |
| 3,373,629 | 3/1968 | Wight et al. .................. 74/492 |
| 3,392,599 | 7/1968 | White ............................ 74/492 |
| 4,989,898 | * 2/1991 | Yamaguchi et al. ........... 280/777 |
| 5,425,553 | 6/1995 | Yazane et al. ................. 280/777 |
| 5,562,307 | * 10/1996 | Connor .......................... 280/777 |
| 5,595,399 | 1/1997 | Fouquet et al. ................ 280/777 |
| 5,609,364 | * 3/1997 | Fouquet et al. ................ 280/777 |
| 5,615,916 | 4/1997 | Fujiu et al. .................... 280/777 |
| 5,669,634 | 9/1997 | Heinzman et al. ............. 280/777 |
| 5,673,937 | 10/1997 | Fevre et al. .................... 280/777 |
| 5,961,146 | * 10/1999 | Matsumoto et al. ........... 280/777 |

FOREIGN PATENT DOCUMENTS

| 0 662 414 | 7/1995 | (EP) . |
| 2 713 188 | 6/1995 | (FR) . |
| 2 714 648 | 7/1995 | (FR) . |
| 2 714 649 | 7/1995 | (FR) . |
| 2 714 650 | 7/1995 | (FR) . |
| 1120799 | 7/1968 | (GB) . |
| 2 279 623 | 1/1995 | (GB) . |
| 2 309 204 | 7/1997 | (GB) . |
| 2 326 135 | 12/1998 | (GB) . |
| 3-136973 | 6/1991 | (JP) . |
| 5-23234 | 4/1993 | (JP) . |
| 5-75057 | 10/1993 | (JP) . |
| 7-23099 | 3/1995 | (JP) . |
| 7-19057 | 4/1995 | (JP) . |
| 7-215221 | 8/1995 | (JP) . |
| 8-85462 | 4/1996 | (JP) . |
| 9-193812 | 7/1997 | (JP) . |
| 9-272448 | 10/1997 | (JP) . |
| WO 95/00383 | 1/1995 | (WO) . |

* cited by examiner

Primary Examiner—Eric Culbreth
Assistant Examiner—J. Allen Shriver
(74) Attorney, Agent, or Firm—Vorys, Sater, Seymour and Pease LLP

(57) ABSTRACT

An impact-absorbing steering column device comprises a steering column which supports a steering shaft to be rotatable, a body-side bracket which is secured to the body of a car and supports the steering column and, to allow the steering column to move forward when an impact load of not less than a predetermined value is applied thereon. An impact energy absorbing mechanism is provided between the steering column and the body-side bracket so as to absorb the impact energy when the steering column is moved. The impact energy absorbing mechanism comprises an energy absorbing member which is produced from metallic wire and has a latch portion latched by the body-side bracket and a drawing portion which is formed on the steering column for drawing and deforming the energy absorbing member when the steering column is moved.

18 Claims, 12 Drawing Sheets

IMPACT-ABSORBING STEERING COLUMN DEVICE

This application claims the benefit of Japanese Application No. 9-347359 which is hereby incorporated by reference.

BACKGROUND OF THE INVENTION

1. Field of the Invention

The present invention relates to an impact-absorbing steering column device, and more specifically, to a technology to reduce the manufacturing cost, facilitate setting of impact-absorbing characteristics of the device, etc.

2. Related Background Art

When a car collides with another car, a building, or the like, the driver in some cases comes into a secondary collision due to inertia and suffers serious damage to his head or chest. Recently, cars and automobiles largely employ, in order to avoid such trouble, an impact-absorbing steering shaft or an impact-absorbing steering column device. An impact-absorbing steering shaft is generally arranged such that the length of a steering shaft on the steering wheel side is reduced when the driver comes into a secondary collision. For this arrangement, the steering shaft is divided into an outer shaft and an inner shaft, and these shafts are engaged with each other to be mutually slidable by serration, etc. An impact-absorbing steering column device is arranged, for example, such that a steering column moves forward together with a steering shaft when the driver comes into a secondary collision. For this arrangement, plastic pins are generally used for connecting a bracket fixed to the car body (a dashboard or the like) (hereinafter called the body-side bracket) with the steering column so that the pins are broken due to the impact load at the time of the secondary collision and causes the steering column to move forward.

Normally, the impact-absorbing steering column device is provided with an impact absorbing means between the body-side bracket and the steering column so as to gradually absorb the impact energy which the steering column moves forward. For example, Japanese Utility Model Application Laid-Open No. 5-75057 discloses such arrangement in which an impact energy absorbing member is interposed between an upper bracket for supporting an upper part of a steering column and the steering column and the impact energy absorbing member is elongated to be plastically deformed when the steering column moves forward. This impact energy absorbing member is formed by punching a steel plate into the form of a pantograph or a waveform, and the fore end of the impact energy absorbing member is welded to the steering column whereas the rear end thereof is locked by a pin inserted through the car body-side bracket. Also, in Japanese Patent Application Laid-Open No. 7-215221, there is disclosed an impact energy absorbing member formed of a band-shaped steel plate, as well as another impact energy member punched from a steel plate and has a pleated elongated portion. The band-shaped steel plate has one end secured to the body-side bracket (or the steering column) and is drawn to be deformed by a drawing portion which is formed on the steering column side (or the body-side bracket) when the steering column is moved forward.

In the above-mentioned impact-absorbing steering column device, since the impact energy absorbing member is made of a steel plate, it requires a great cost to produce a press metal mold for punching the member. Also, since the weight per unit area of the steel plate is large, if an impact absorbing stroke is made large, the whole weight of the steering device also becomes large. Also, if the impact energy absorbing member is made in the form of a pantograph or wave form, a large amount of waste material is generated when the impact energy absorbing member is punched, so as to bring about a very poor yield of material. For the steering device in which an impact energy absorbing member is welded to a steering column or the like, the process of assembling the steering device includes a welding work, which inevitably causes a decline of the assembling workability and deterioration of working environments. In addition, in a steering device of this type, it is desirable to set the impact absorbing characteristics freely, which, however, requires a great cost when the specifications are altered, because a press metal mold is used for punching the impact absorbing member.

SUMMARY OF THE INVENTION

The present invention was conceived taking the above circumstances into consideration, and an object of the invention is to provide an impact-absorbing steering column device which is adapted to reduce the manufacturing cost and to facilitate setting of the impact absorbing characteristics.

The present invention proposes, in order to solve the above-mentioned problems, an impact-absorbing steering column device comprising a steering column which supports a steering shaft to be rotatable, a body-side bracket which is secured to the body of a car and supports the steering column and allows the steering column to move when an impact load of not less than a predetermined value is applied thereon, and an impact energy absorbing means which is provided between the steering column and the body-side bracket so as to absorb the impact energy when the steering column is moved, wherein the impact energy absorbing means comprises an energy absorbing member which is produced from metallic wire and has a latch portion latched by the body-side bracket and a drawing portion which is formed on the steering column for drawing and deforming the energy absorbing member when the steering column is moved.

According to the present invention, when the steering column is released from the body-side bracket and moves forward, the energy absorbing member is drawn and deformed by the drawing portion of the steering column, so as to absorb the impact energy at that time. Also, the impact absorbing characteristics can be easily set by properly altering the form or size of the energy absorbing member with a bending die.

Also according to the present invention, there is provided an impact-absorbing steering column device which comprises a steering column for supporting a steering shaft to be rotatable, a bracket device secured to the body side for supporting the steering column, so as to release the supported state of the steering column to allow the steering column to move when an impact load of not less than a predetermined value is applied thereon, and an energy absorbing device provided between the bracket device and the steering column so as to absorb the impact energy when the steering column is moved because of the load of not less than the predetermined value. The energy absorbing device comprises: a metallic wire which consists of first and second portions extending substantially in parallel and a connection portion integrally continuous to the first and second portions, in which the first and second portions are respectively extended to non-restrained end portions through bent back portions formed substantially equidistant from the connection portion; a restraint portion which is secured to the car body for supporting the wire between the connection portion and the bent back portions so as to restrain the connection portion when the impact load is applied onto the wire; and a coupler which is secured to the steering column and is provided with a pin around which the bent back portions of the wire are passed and against which the bent back portions are born, whereby when the steering column is moved upon application of the impact load, said coupler is moved together with the steering column to move the wire by a predetermined distance through the pin so as to restrain the connection portion at the restraint portion, so that the first and second portions of the wire are drawn by the pin and are plastically deformed to absorb the impact load.

BRIEF DESCRIPTION OF THE DRAWINGS

FIG. 4 is an exploded perspective view of a coupler, a lower bracket, and the like.

DESCRIPTION OF THE PREFERRED EMBODIMENTS

Embodiments of the present invention will be described below with reference to drawings.

Figure 1:
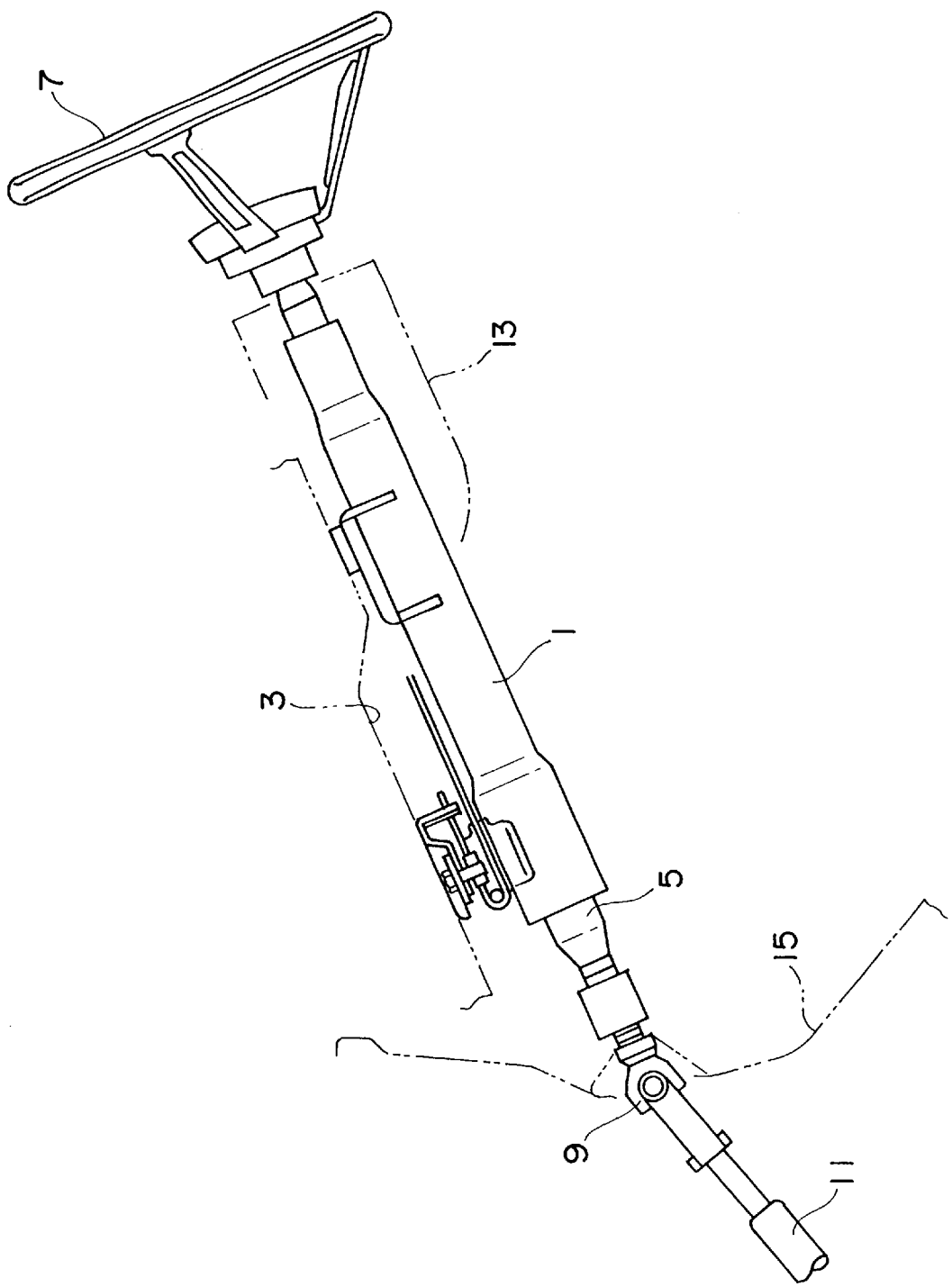
FIG. 1 is a view for explaining the structure of a steering device on the car interior side.

FIG. 1 is a side view for showing a steering device on the car interior side. Referring to FIG. 1, a reference numeral 1 denotes a steering column. The steering column 1 is secured to a car body 3 at two positions on upper and lower parts thereof, so as to support an upper steering shaft (hereinafter simply called the steering shaft) 5 to be rotatable by use of bearings (not shown). The steering shaft 5 is provided with a steering wheel 7 at the upper end thereof, and is connected with a lower steering shaft 11 at the lower end thereof through a universal joint 9. In FIG. 1, a reference numeral 13 denotes a column cover for covering the upper part of the steering column 1, and a reference numeral 15 denotes a dashboard for partitioning the car interior and an engine compartment.

With this steering device, when the driver rotates the steering wheel 7, a rotational force thereof is transmitted to steering gear (not shown) through the steering shaft 5 and the lower steering shaft 11. The steering gear incorporates therein a rack-and-pinion mechanism, etc., for transforming the supplied rotational force into a rectilinear motion, so as to effect steering by altering the steering angle of the wheels through a tie rod. It should be noted that as this steering gear, in addition to a rack-and-pinion type steering gear, ball-screw type, warm roller type, and other various types of steering gears are known.

Figure 2:
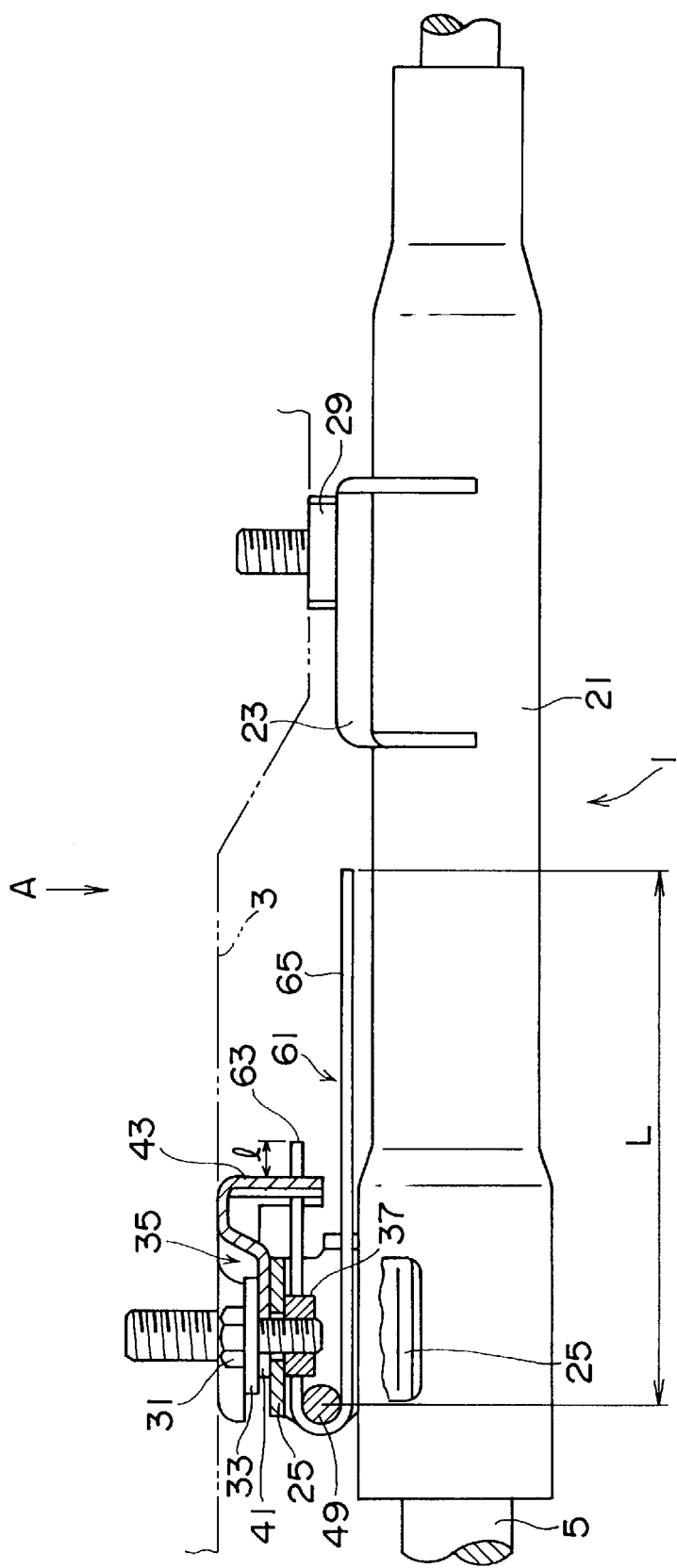
FIG. 2 is a side view for showing an impact-absorbing steering column device according to a first embodiment of the present invention.
Figure 3:
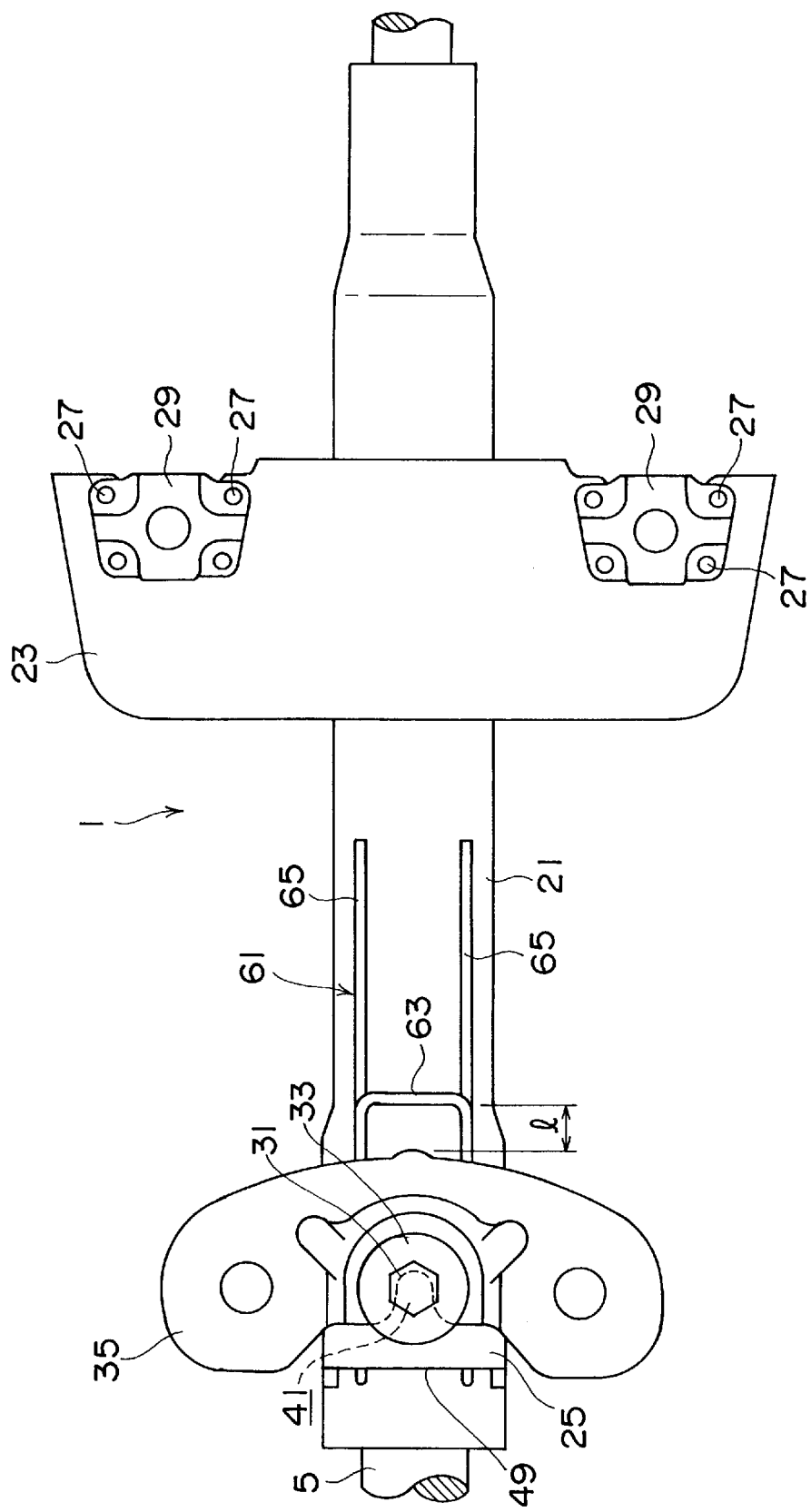
FIG. 3 is a view seen from the direction of the arrow A in FIG. 2.

FIG. 2 is a side view of an impact-absorbing steering column device according to a first embodiment of the present invention. FIG. 3 is a plan view showing the same device (seen from the arrow A in FIG. 2). As shown in these drawings, the steering column 1 is assembled by welding an upper bracket 23 made of a steel plate to the upper part (on the right side of FIGS. 2 and 3) of a column tube 21, and a coupler 25 which is also made of a steel plate to a lower part (on the left side of FIGS. 2 and 3) of the same tube.

The upper bracket 23 is secured through a total of eight plastic pins 27 to a pair of aluminum capsules 29 which are provided laterally and bolted on the car body 3. Also, the coupler 25 is secured through a bolt 31 and a washer 33 to a lower bracket 35 which is bolted on the car body and made of a steel plate, with a predetermined frictional force. In FIG. 2, a reference numeral 37 denotes a weld nut which is secured to the coupler 25. At the center of the lower bracket 35, there is formed a U-shaped notch 41 which opens forward, as shown in FIG. 3, and a shank of the bolt 31 is fitted in this U-shaped notch 41.

Figure 4:
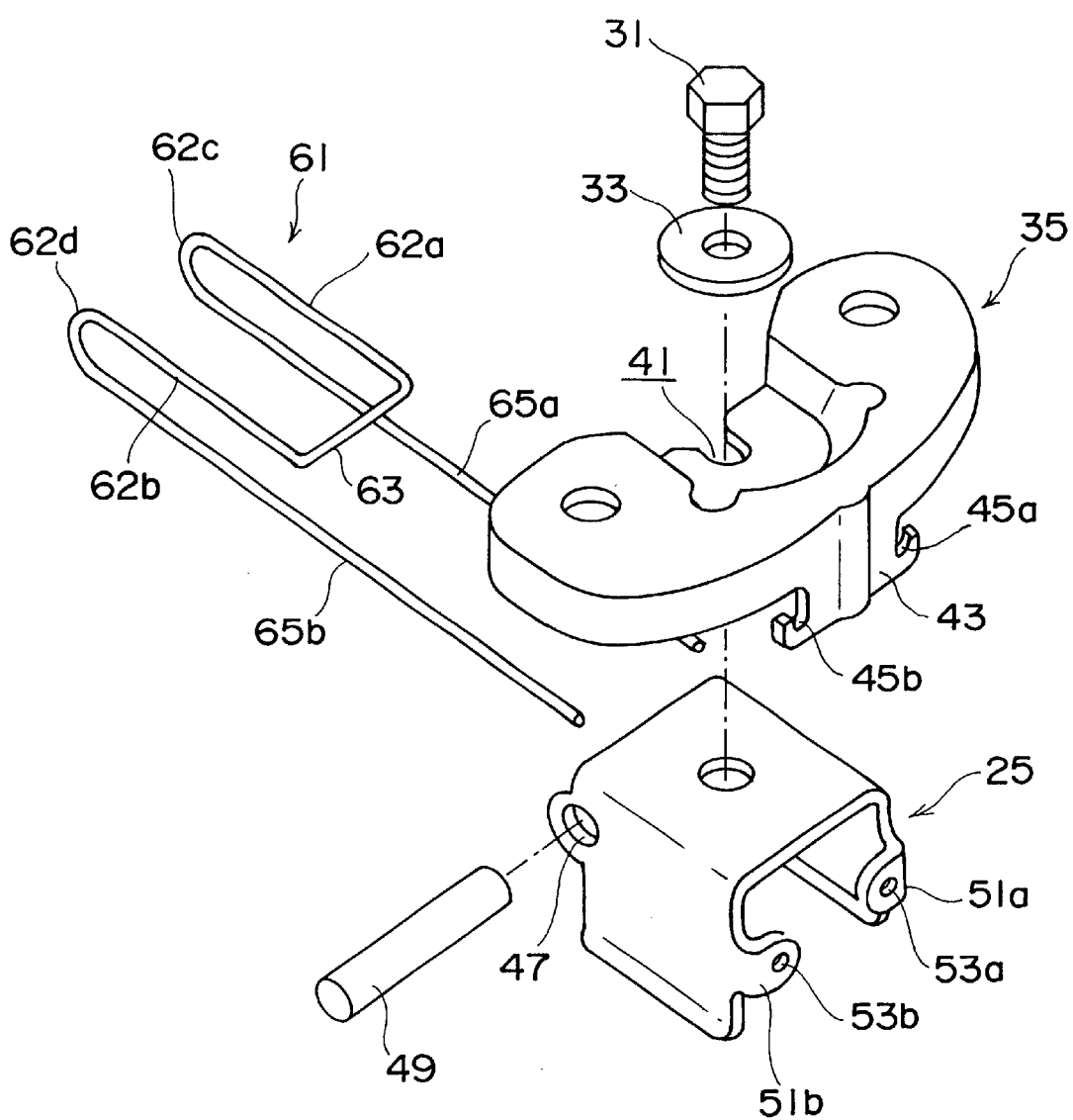

The lower bracket 35 is integrally provided with a latching piece 43 projecting downward, as shown in FIG. 4 (an exploded perspective view of the coupler 25, the lower bracket 35, and the like), and this latching piece 43 is provided with a lateral pair of guide portions 45a, 45b. Through holes 47 are formed at the fore ends of both side walls of the coupler 25, and a drawing pin 49 made of steel is inserted through these through holes 47. Also, a pair of retaining pieces 51a, 51b are formed inward at the rear ends of the coupler 25, and retaining holes 53a, 53b are formed on these retaining pieces 51a, 5b, respectively.

An absorber 61 which serves as an energy absorbing member is made of one plastically deformable steel wire. This steel wire is comprised of two linearly elongated portions 62a, 62b which are extending in parallel with the steering column and are substantially parallel with each other, and an angular U-shaped bent portion 63 which is connected to these linearly elongated portions 62a, 62b as a continuous integral structure. The angular U-shaped bent portion 63 is arranged to the rear of the latching piece 43 to oppose the latching piece 43 with a distance 1 therebetween, and the two linearly elongated portions 62a, 62b are retained and guided by the guide portions 45a, 45b of the latching piece 43 to be further extended forward. The two linearly elongated portions 62a, 62b pass around the pin 49 to be folded back at bent back portions 62c, 62d which are extended substantially perpendicular to the linearly elongated portions 62a, 62b, and then linearly extended substantially in parallel with the linearly elongated portions 62a, 62b , thereby constituting linear portions 65a, 65b. The linear portions 65a, 65b are respectively inserted through the retaining holes 53a, 53b to reach the non-restrained end portions. These linear portions 65a, 65b are extended backward from the axial center of the pin 49 over the length L, so as to constitute plastic deformation portions.

An operation of the first embodiment of the present invention will be described below.

Figure 5:
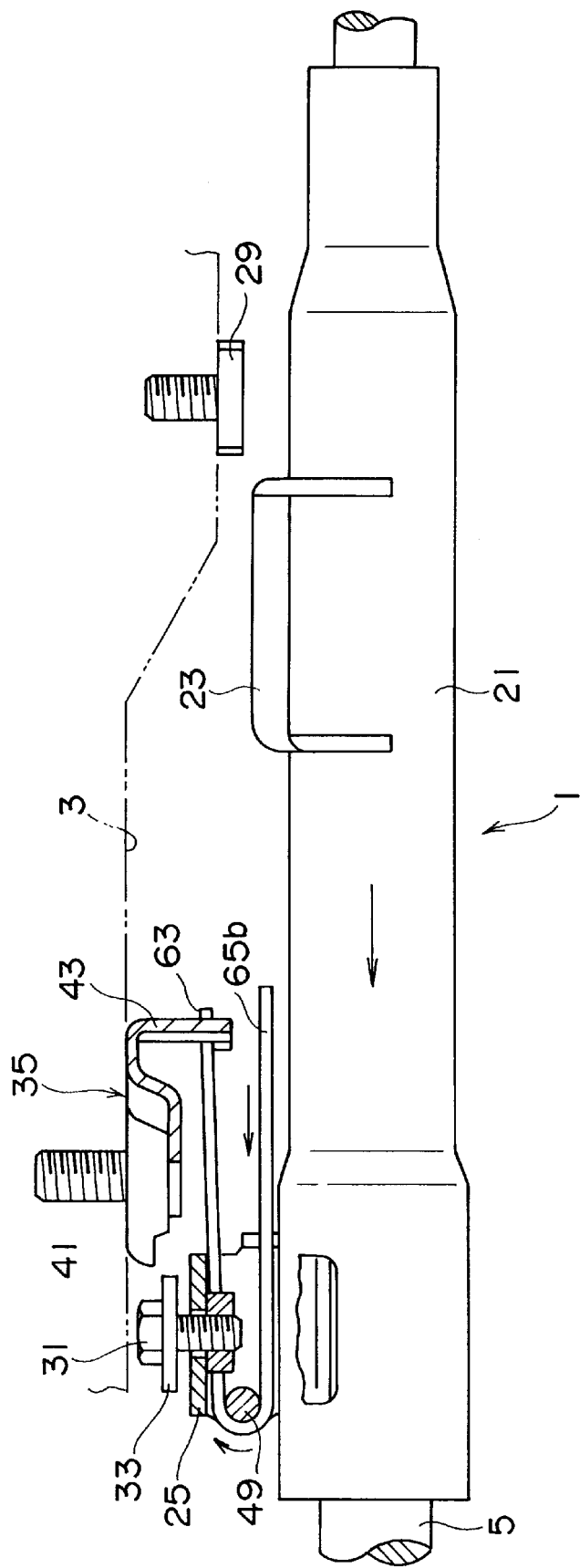
FIG. 5 is a view for explaining the mode of a function in the first embodiment.

When the driver comes into a secondary collision with the steering wheel 7 upon collision of a car, a large impact load is applied onto the steering column 1 through the steering shaft 5. As a result, the plastic pins 27 are sheared off and, as shown in FIG. 5, the upper bracket 23 and the aluminum capsule 29 are separated from each other. Also, the coupler 25, the bolt 31, and the washer 33 overcome the frictional force with the lower bracket which is secured to the chassis and move forward, whereby the steering column 1 is separated from the car body 3.

Since the steering column normally moves obliquely forward (the direction indicated by the arrow in FIG. 5) even after it is separated from the car body 3, the angular bent portion 63 is brought into contact with the rear portion of the latching piece 43 and is latched or detained there, when the absorber 61 is moved by a predetermined amount (the distance 1) together with the coupler 25. Incidentally, the steering column 1 is moved (or runs idle) with no substantial resistance until the time at which the angular bent portion 63 is brought into contact with the latching piece 43, so that it becomes possible to properly set the energy absorbing characteristics by changing the distance 1.

Figure 6:
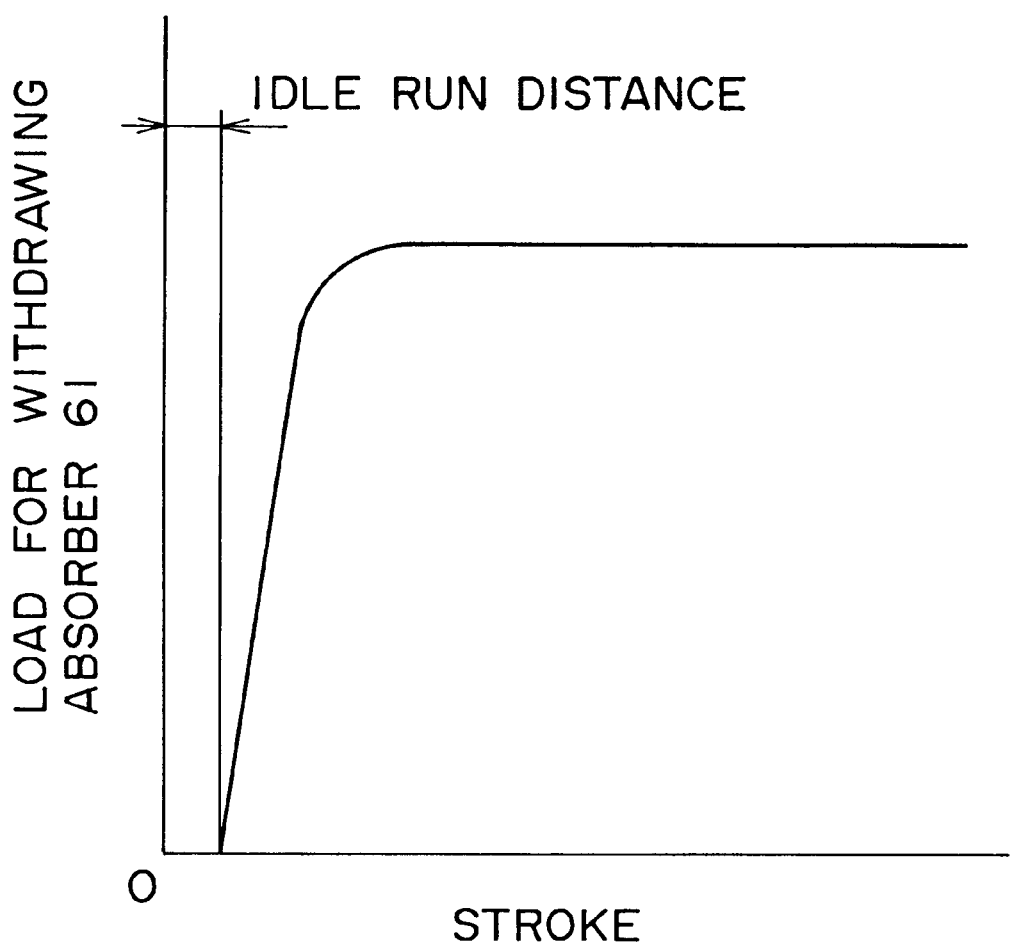
FIG. 6 is a graph for showing the impact absorbing characteristics according to the first embodiment.

When the steering column is further moved, since the U-shaped bent portion 63 of the absorber 61 is latched by the latch piece 43, the plastic deformation portions 65a, 65b are drawn progressively around the drawing pin 49, as shown in FIG. 5, so as to absorb the impact energy by the plastic deformation. In this case, since the absorber 61 is made of steel wire, even if the direction, or the like, of the movement of the steering column 1 is slightly shifted, the absorber 61 can be easily flexed and gives no substantial influence on the impact absorbing characteristics. FIG. 6 is a graph for showing the impact absorbing characteristics in the first embodiment, which illustrates that, after the steering column 1 is moved by a predetermined idle distance, the impact energy is absorbed substantially correspondingly to an amount of the movement.

As described above, according to the first embodiment, the absorber 61 made of steel wire is used as the impact energy absorbing member so that it is possible to produce an impact-absorbing steering column device having excellent impact absorbing characteristics, while reducing the producing cost and the number of assembling steps therefor. It is also possible to arbitrarily set the idle run distance of the steering column 1 or an impact energy absorbing stroke by altering the distance 1 between the angular bent portion 63 and the latch piece 43 or the length L of the plastic deformation portion 65.

Figure 7:
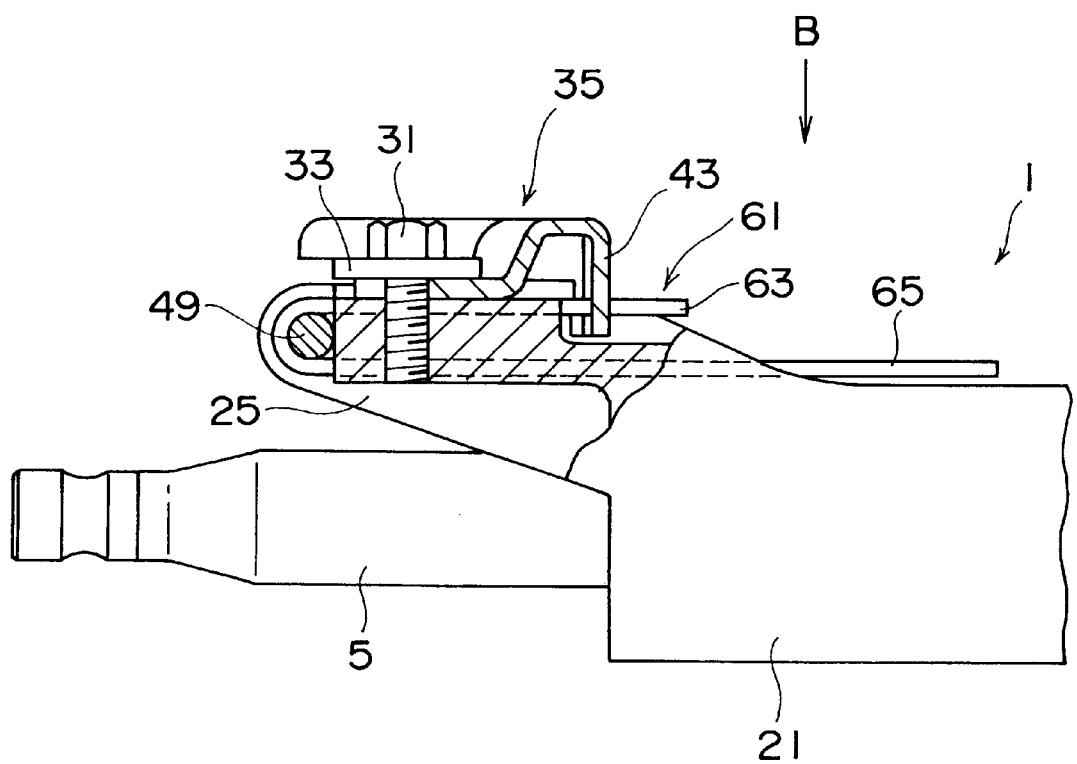
FIG. 7 is a side view for showing an impact absorbing steering column device according to a second embodiment of the present invention.
Figure 8:
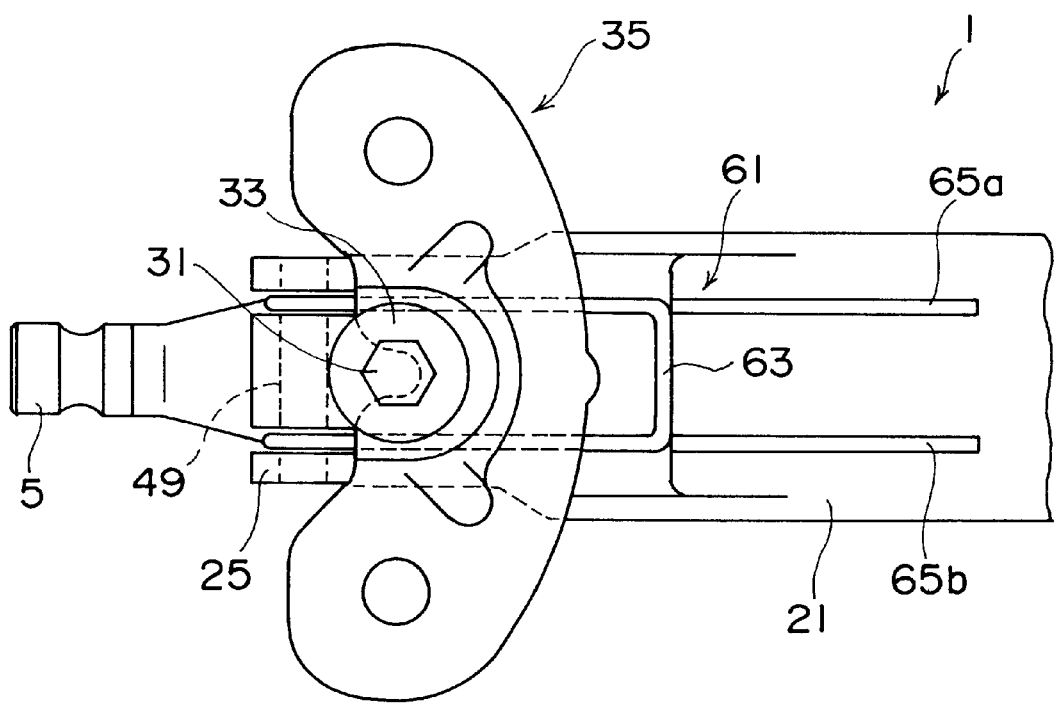
FIG. 8 is a view seen from the direction of the arrow B in FIG. 7.

FIG. 7 is a side view for showing an impact absorbing steering column device according to a second embodiment of the present invention, whereas FIG. 8 is a plan view showing the same device (seen from the direction indicated by the arrow B in FIG. 7). As shown in these drawings, the second embodiment adapts substantially the same structure as that of the first embodiment. However, since the steering column 1 is formed of aluminum alloy by die casting, the column tube 21 and the coupler 25 are formed as an integral structure. According the second embodiment, the number of constituent parts and the number of assembling steps are reduced and a dimensional accuracy of the coupler 25 is enhanced.

Figure 9:
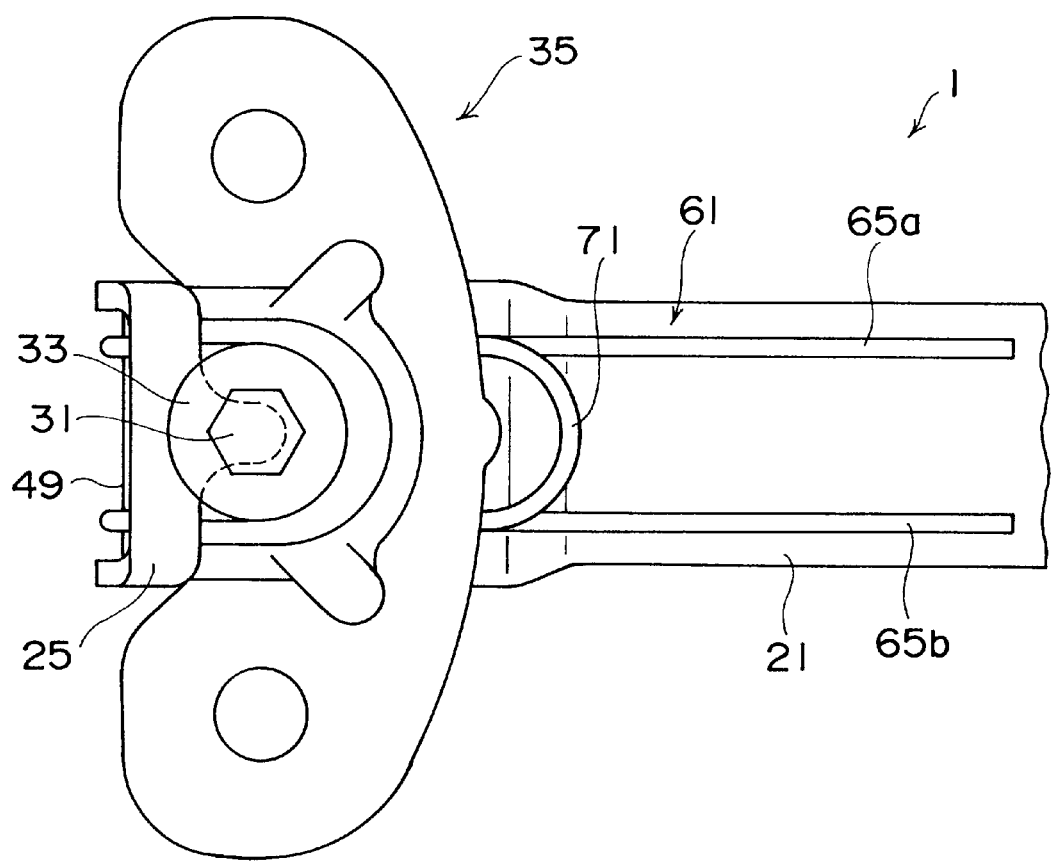
FIG. 9 is a plan view for showing an essential structure of an impact-absorbing steering column device according to a third embodiment of the present invention.
Figure 10:
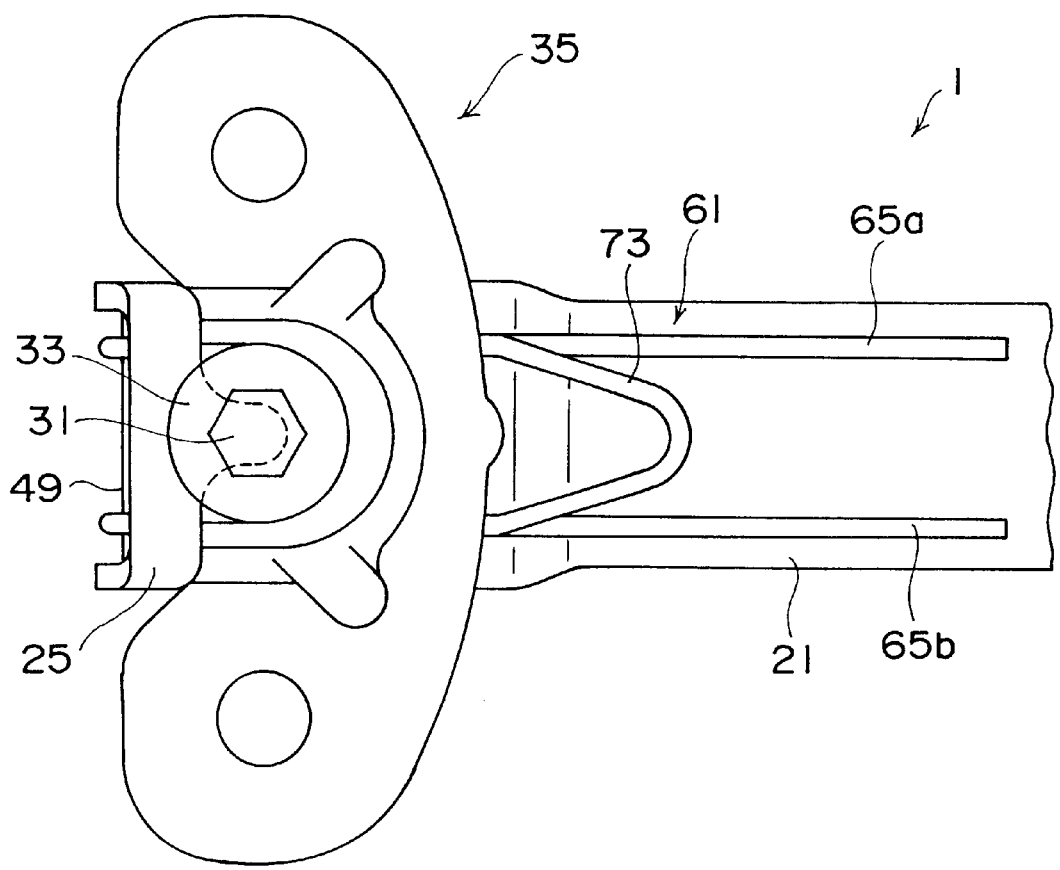
FIG. 10 is a plan view for showing an essential structure of an impact-absorbing steering column device according to a fourth embodiment of the present invention.
Figure 11:
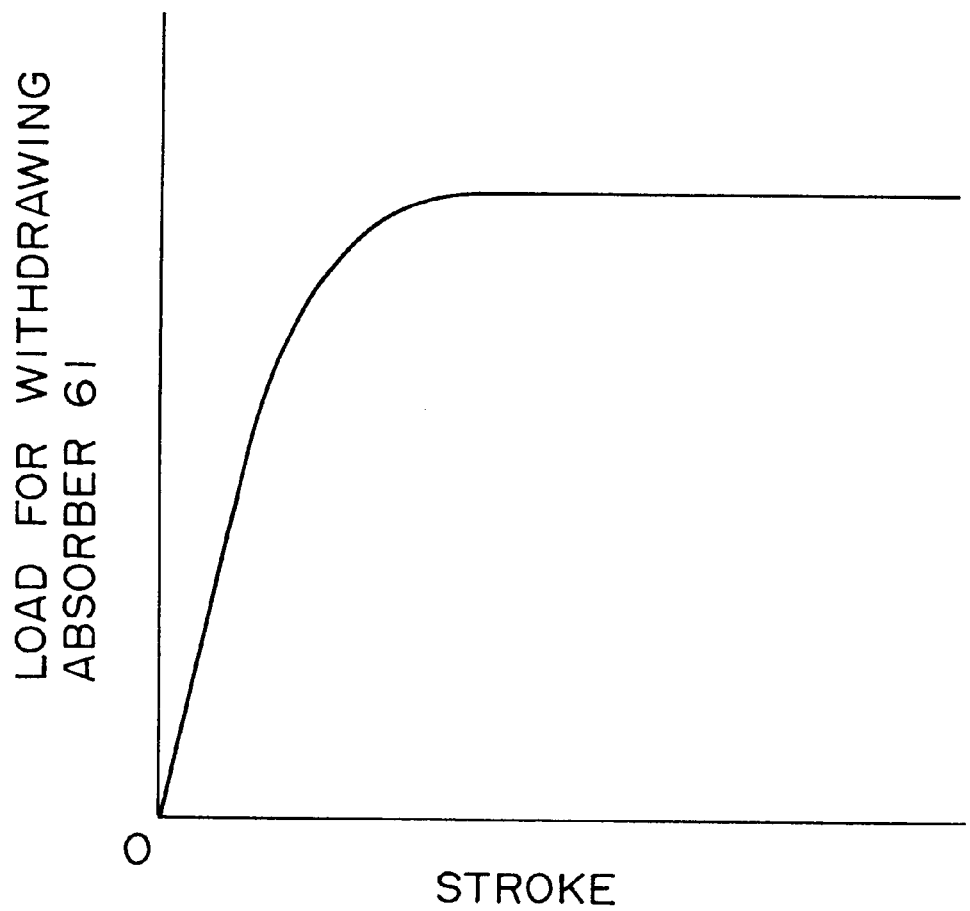
FIG. 11 is a graph for showing the impact absorbing characteristics according to the third embodiment.
Figure 12:
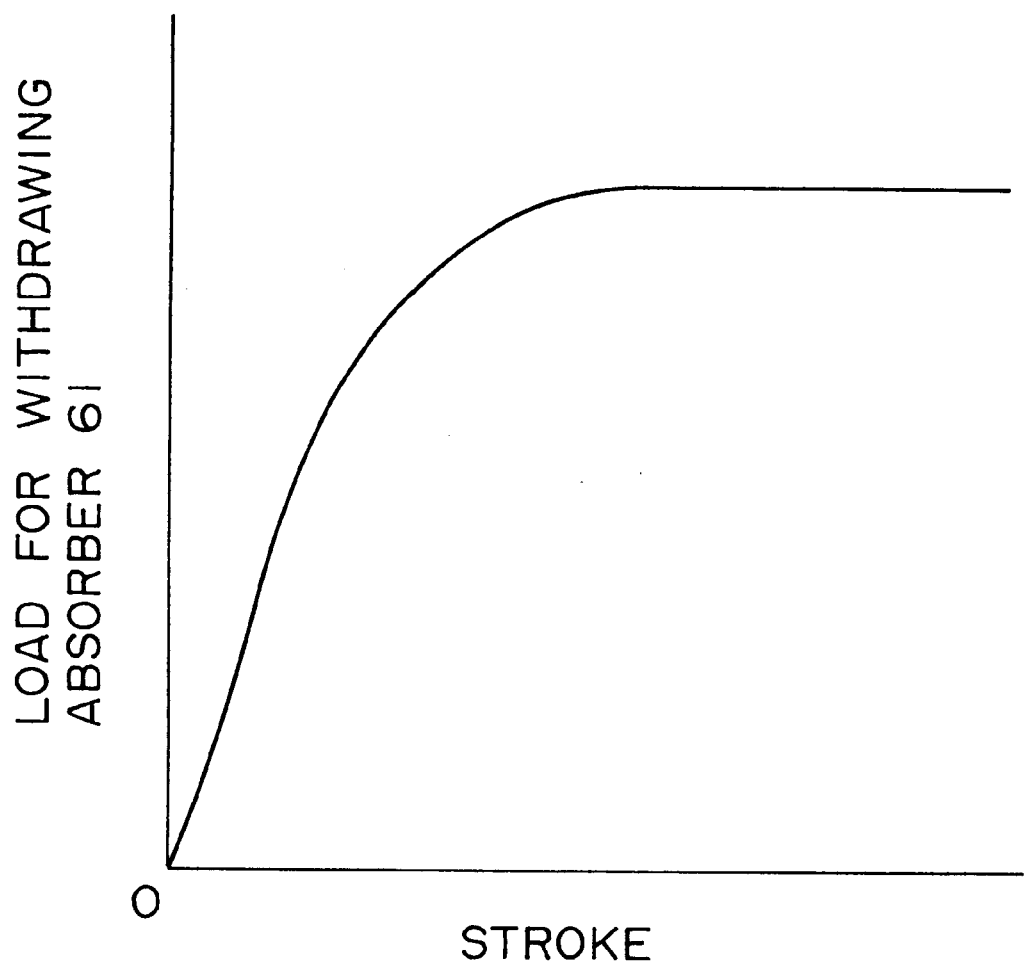
FIG. 12 is a graph for showing the impact absorbing characteristics according to the fourth embodiment.

FIGS. 9 and 10 are plan views showing principal structures of impact-absorbing steering column devices according to third and fourth embodiments of the present invention. These embodiments adapt substantially the same structure as that of the first embodiment, except that the shape of the absorber 61 is altered in both embodiments. More specifically, a portion which is brought into contact with by the latching piece 43 of the lower bracket 35 and latched there is a U-shaped bent portion 71 which is bent into the shape of U in the third embodiment, whereas the same portion is a V-shaped bent portion 73 which is bent into the shape of V in the fourth embodiment. As a result, idle run of the steering column 1 does not occur in these embodiments, and the impact absorbing characteristics which fluctuate comparatively smoothly can be obtained in the third embodiment, as shown in the graph of FIG. 11. On the other hand, the impact absorbing characteristics which fluctuate more smoothly can be obtained in the fourth embodiment.

Although the preferred embodiments of the invention have been described herein, it will be appreciated that the present invention are not limited to those embodiments. For example, though it is arranged that the absorber is interposed between the lower bracket on the car body side and the coupler on the steering column side in the foregoing embodiments, it is possible to interpose the absorber between, for example, the capsule and the upper bracket. Also, it is arranged that the absorber is plastically deformed by one drawing pin which is secured to the coupler in the foregoing embodiments. However, it is possible to use a plurality of drawing pins, instead. It is also possible to dispose the drawing member in the coupler itself. Further, it is possible to alter a specific structure of the steering column device or a specific form, etc., of the impact energy absorbing member in keeping wit the principles of the present invention.

As described above, in the impact-absorbing steering column device according to the present invention, there are provided the steering column for supporting the steering shaft to be rotatable, the body-side bracket which is secured to the car body side to support the steering column and to allow the steering column to move forward when an impact load of not less than a predetermined value is applied thereon, and the impact energy absorbing means which is provided between the steering column and the body-side bracket so as to absorb the impact energy upon movement of the steering column. The impact energy absorbing means is preferably formed of metallic wire and comprises the energy absorbing member having the latching portion which is latched at the body-side bracket, and the drawing portion formed on the steering column to plastically deform the energy absorbing member when the steering column is moved. As a result, it becomes very easy to set the energy absorbing characteristics. Also, it becomes possible to reduce the manufacturing cost and the weight of the steering column device.

What is claimed is:

1. An impact-absorbing steering column device, comprising:

a steering column supporting a steering shaft to be rotatable;

an upper bracket supporting a rearward portion of said steering column;

a connecting device which holds the upper bracket to a body of a vehicle and which, when an impact load not less than a predetermined value is applied to said steering column, releases said upper bracket to allow said steering column to move;

a lower bracket secured to the body of the vehicle and to which a forward portion of said steering column is releasably supported such that said forward portion of said steering column is released in response to said impact load to allow the movement of said steering column; and an energy absorbing device provided between said lower bracket and said steering column so as to absorb impact energy when said steering column is moved due to the impact load, wherein said energy absorbing device includes:

a metallic wire having first and second portions extending substantially in parallel and a connection portion integrally continuous to said first and second portions, said first and second portions being respectively extended to non-restrained end portions through bent back portions formed substantially equidistant from said connection portion;

a restraint portion which is secured to the vehicle body and disposed between said connection portion and said bent back portions so as to restrain said connection portion when said steering column is moved due to the impact load; and a coupler which is secured to the forward portion of said steering column and provided with a pin around which said bent back portions of said wire pass and against which said bent back portions are born, whereby when said steering column is moved due to the impact load, said coupler is moved together with said steering column, and moves said wire through said pin with said connection portion restrained at said restraint portion, so that said first and second portions of said wire are drawn by said pin and plastically deformed to absorb the impact load.

2. An impact-absorbing steering column device according to claim 1, wherein said restraint portion supports said first and second portions of said wire at a position between said connection portion and said bent back portions.

3. An impact-absorbing steering column device according to claim 1, wherein said connection portion has substantially a U shape.

4. An impact-absorbing steering column device according to claim 1, wherein said connection portion has substantially a V shape.

5. An impact-absorbing steering column device according to claim 1, wherein a part of said connection portion extending transversely to said first and second portions of said wire is spaced by a predetermined distance from said restraint portion.

6. An impact-absorbing steering column device according to claim 5, wherein said pin moves said wire through said predetermined distance to cause said connection portion to be restrained by said restraining portion.

7. An impact-absorbing steering column device, comprising:

a steering column supporting a steering shaft to be rotatable;

an upper bracket supporting a rearward portion of said steering column;

a first connecting device which holds the upper bracket to a body of a vehicle and which, when an impact load not less than a predetermined value is applied to said steering column, releases the upper bracket to allow the steering column to move;

a lower bracket secured to the vehicle body;

a second connecting device which holds a forward portion of said steering column to said lower bracket and which releases said steering column from the lower bracket in response to the impact load to allow the movement of said steering column; and an impact energy absorbing device which is provided between said lower bracket and the forward portion of said steering column to absorb impact energy when said steering column is moved due to the impact load;

wherein said impact energy absorbing device includes:

an energy absorbing member of metallic wire having a latch portion latched by said lower bracket; and a drawing member which is provided on said steering column to draw and deform said energy absorbing member when said steering column is moved due to the impact load.

8. An impact-absorbing steering column device, comprising:

a steering column supporting a steering shaft to be rotatable;

an upper bracket supporting a rearward portion of said steering column;

a first connecting device which holds the upper bracket to a body of a vehicle and which, when an impact load not less than a predetermined value is applied to said steering column, releases the upper bracket to allow said steering column to move;

a lower bracket secured to the vehicle body and supporting a forward portion of said steering column;

a coupler secured to the forward portion of said steering column;

a second connecting device which holds said coupler to said lower bracket and which releases said coupler from said lower bracket in response to the impact load to allow the movement of said steering column; and an impact energy absorbing device which is provided between said lower bracket and said coupler to absorb impact energy when said steering column is moved due to the impact load;

wherein said impact energy absorbing device includes:

an energy absorbing member of metallic wire having latch portion latched by said lower bracket; and a drawing member attached to said coupler to draw and deform said energy absorbing member when said steering column is moved due to the impact load.

9. An impact-absorbing steering column device, comprising:

a steering column supporting a steering shaft to be rotatable;

a bracket secured to a vehicle body;

a coupler secured to said steering column;

a connecting device which holds said coupler to said bracket and which releases said coupler from said bracket in response to an impact load not less than a predetermined value applied to said steering column; and an impact energy absorbing device provided between said bracket and said coupler to absorb impact energy when said steering column is moved due to the impact load;

wherein said impact energy absorbing device includes:

a metallic wire having first and second portions extending substantially in parallel and a connection portion integrally continuous to said first and second portions, said first and second portions being respectively extended to non-restrained end portions through bent back portions formed substantially equidistant from said connection portion;

a restraint portion which is secured to the vehicle body and disposed between said connection portion and said bent back portions so as to restrain said connection portion when said steering column is moved to the impact load; and a pin connected to a sidewall portion of said coupler and cooperable with at least one of said folded back portions of said wire to draw and plastically deform said first and second portions of said wire with said connection portion being restrained at said restraint portion when said steering column is moved due to the impact load.

10. An impact-absorbing steering column device according to claim 9, wherein said coupler is generally U-shaped and has opposite sidewalls attached to said steering column, and said pin is connected to at least one of said sidewalls.

11. An impact-absorbing steering column device according to claim 10, wherein said pin is connected to both of said sidewalls and cooperates with each of said folded back portions of said wire.

12. An impact-absorbing steering column device according to claim 11, wherein said pin is received in holes of said sidewalls.

13. An impact-absorbing steering column device according to claim 10, wherein said coupler includes first and second retaining pieces, and said first and second portions of said wire are passed through holes formed in said first and second retaining pieces, respectively.

14. An impact-absorbing steering column device according to claim 9, wherein said bracket is a lower bracket and said coupler is fixed to a forward portion of said steering column, and further comprising an upper bracket supporting a rearward portion of said steering column, and a connecting device which holds the upper bracket to the body of the vehicle and which releases the upper bracket in response to the impact load to allow the movement of said steering column.

15. An impact-absorbing steering column device according to claim 14, wherein said coupler is generally U-shaped and has opposite sidewalls attached to said steering column, and said pin is connected to at least one of said sidewalls.

16. An impact-absorbing steering column device according to claim 15, wherein said pin is connected to both of said sidewalls and cooperates with each of said folded back portions of said wire.

17. An impact-absorbing steering column device according to claim 16, wherein said pin is received in holes in said sidewalls.

18. An impact-absorbing steering column device according to claim 15, wherein said coupler includes first and second retaining pieces, and said first and second portions of said wire are passed through holes formed in said first and second retaining pieces, respectively.

* * * * *